(12) United States Patent
Chen et al.

(10) Patent No.: US 11,788,865 B2
(45) Date of Patent: Oct. 17, 2023

(54) DIRECTIONAL AND TIMING CONTROL CIRCUIT FOR WATER PUMP

(71) Applicant: BESTWAY INFLATABLES & MATERIAL CORP., Shanghai (CN)

(72) Inventors: Xiaobo Chen, Jinhua (CN); Zhipeng Dai, Jinhua (CN); Yuanjie Li, Jinhua (CN); Feng Ye, Jinhua (CN)

(73) Assignee: BESTWAY INFLATABLES & MATERIAL CORP., Shanghai (CN)

( * ) Notice: Subject to any disclaimer, the term of this patent is extended or adjusted under 35 U.S.C. 154(b) by 177 days.

(21) Appl. No.: 17/505,279

(22) Filed: Oct. 19, 2021

(65) Prior Publication Data

US 2022/0163350 A1 May 26, 2022

(30) Foreign Application Priority Data

Nov. 20, 2020 (CN) .......................... 202022720821.6

(51) Int. Cl.
*H02P 1/22* (2006.01)
*G01D 5/14* (2006.01)
(Continued)

(52) U.S. Cl.
CPC ........... *G01D 5/145* (2013.01); *F04B 49/065* (2013.01); *H02P 6/16* (2013.01)

(58) Field of Classification Search
CPC .............. H02P 6/16; H02P 6/30; H02P 27/16
See application file for complete search history.

(56) References Cited

U.S. PATENT DOCUMENTS

| | | | |
|---|---|---|---|
| 2006/0043918 A1 | 3/2006 | Kemp | |
| 2014/0192442 A1 | 7/2014 | Guadiz | |
| 2018/0131295 A1* | 5/2018 | Sun | ...................... H03K 3/0231 |

FOREIGN PATENT DOCUMENTS

| | | |
|---|---|---|
| CN | 103454464 | 12/2013 |
| CN | 206024207 | 3/2017 |

(Continued)

OTHER PUBLICATIONS

SEC Electronics Inc.: "Liner Hall Effect Sensor", Internet, Mar. 28, 2008 (Mar. 28, 2008), Retrieved from the Internet: URL:http://arduino-projekte.info/datasheet/49E_datenblatt.pdf [retrived on Apr. 7, 2022], 4 pages.

(Continued)

*Primary Examiner* — Muhammad S Islam
(74) *Attorney, Agent, or Firm* — DICKINSON WRIGHT PLLC

(57) ABSTRACT

A directional and timing control circuit is provided. the circuit includes a main control chip, a power supply module to supply power to the main control chip, a driver module configured to receive a control command from the main control chip and to control a motor according to the control command, a Hall module configured to detect an operation direction of the motor and transmit an operation direction signal to the main control chip, and a zero-crossing detection module configured to detect a zero-crossing cycle of the alternating current power supply to thereby obtain a current utility frequency of the alternating current power supply as a timing frequency of the main control chip, the zero-crossing detection module including an input terminal connected to the alternating current power supply and an output terminal connected to a phase detection terminal of the main control chip.

7 Claims, 2 Drawing Sheets

(51) Int. Cl.
*F04B 49/06* (2006.01)
*H02P 6/16* (2016.01)

(56) References Cited

FOREIGN PATENT DOCUMENTS

| | | |
|---|---|---|
| EP | 3222853 | 9/2017 |
| JP | 2002191458 | 7/2002 |
| KR | 20160076845 | 7/2016 |

OTHER PUBLICATIONS

Extended European Search Report dated Apr. 20, 2022 (Apr. 20, 2022) issued on related European patent application EP21204571.0 by the European Patent Office.

\* cited by examiner

DIRECTIONAL AND TIMING CONTROL CIRCUIT FOR WATER PUMP

CROSS-REFERENCE TO RELATED APPLICATION

This application claims priority from Chinese Application CN202022720821.6, filed Nov. 20, 2020 in China, the disclosure of which is incorporated herein by reference in its entirety.

BACKGROUND

1. Field

Apparatuses and methods consistent with exemplary embodiments relate to water pump control circuits, and in particular, to a directional and timing control circuit for a water pump.

2. Description of the Related Art

A swimming pool pump may be used to filter and recycle water in a swimming pool. A common swimming pool pump does not typically run or stop running in an automatically cycling manner. Thus, the pump must be manually started and stopped at certain intervals, to ensure that the water in the swimming pool is appropriately filtered and recycled. This is troublesome and labor-consuming. Most current swimming pool pumps are plug-and-play and unplug-and-stop, which is inconvenient. Additionally, as rotation directions of pumps are generally random, it is difficult to increase the flow rate and efficiency of the water pumps. Pumps cannot be timed, and the filtering effect thereof is not obvious after a certain time period. Therefore, continuous operation of a pump may waste energy.

SUMMARY

Example embodiments may address at least the above problems and/or disadvantages and other disadvantages not described above. Also, example embodiments are not required to overcome the disadvantages described above, and may not overcome any of the problems described above.

According to an aspect of an example embodiment, a directional and timing control circuit comprises: a main control chip; a power supply module connected to the main control chip to supply power to the main control chip, the power supply module comprising an input terminal configured to connect to an alternating current power supply; a driver module configured to receive a control command from the main control chip and to control a motor according to the control command; a Hall module configured to detect an operation direction of the motor and transmit an operation direction signal to the main control chip; and a zero-crossing detection module configured to detect a zero-crossing cycle of the alternating current power supply to thereby obtain a current utility frequency of the alternating current power supply as a timing frequency of the main control chip, the zero-crossing detection module comprising an input terminal connected to the alternating current power supply and an output terminal connected to a phase detection terminal of the main control chip.

The power supply module may comprise: a power supply resistor comprising a first terminal and a second terminal; a first capacitor which is an electrolytic capacitor comprising: a positive electrode connected to a live wire input terminal, and a negative electrode which is grounded a second capacitor comprising: a first terminal connected to the second terminal of the power supply resistor, and a second terminal connected to a neutral wire input terminal; a first diode comprising: an anode connected to the negative electrode of the first capacitor, and a cathode connected to the first terminal of the power supply resistor; a second diode which is a Zener diode comprising: a cathode connected to the positive electrode of the first capacitor and to a power supply terminal of the main control chip; and an anode connected to the first terminal of the power supply resistor.

The driver module may be a thyristor driver module comprising: a bi-directional thyristor comprising: a first terminal connected to the live wire input terminal, a second terminal which is a live wire output terminal, and; a control terminal; and a driver module resistor comprising: a first terminal connected to the control terminal of the bi-directional thyristor, and a second terminal connected to a control output terminal of the main control chip; wherein the second terminal of the second capacitor is a neutral wire output terminal.

The driver module may further comprise: a capacitor connected between the live wire output terminal and the neutral wire output terminal.

The Hall module may comprise: a Hall element comprising: a power input terminal connected to a push-pull output port of the main control chip, a signal output terminal connected to an operation direction detection port of the main control chip, and a ground terminal; and a Hall module resistor comprising: a first terminal connected to the ground terminal of the Hall element, and a second terminal which is grounded.

The Hall module may comprise: a Hall element comprising: a power input terminal connected to a push-pull output port of the main control chip, a signal output terminal connected to an operation direction detection port of the main control chip, and a ground terminal; and a Hall module resistor comprising: a first terminal connected to the ground terminal of the Hall element, and a second terminal which is grounded.

The zero-crossing detection module may comprise: a first resistor comprising: a first terminal that is an input terminal configured to be connected to the alternating current power supply, and a second terminal; a second resistor comprising: a first terminal connected to the second terminal of the first resistor, and a second terminal; a first diode comprising: an anode connected to the second terminal of the second resistor, and a cathode connected to the phase detection terminal of the main control chip; a second diode comprising: a cathode connected to the second terminal of the second resistor, an anode which is grounded; and a capacitor comprising: a first terminal connected to the second terminal of the second resistor, a second terminal which is grounded.

BRIEF DESCRIPTION OF THE DRAWINGS

The above and/or other aspects will become apparent and more readily appreciated from the following description of example embodiments, taken in conjunction with the accompanying drawings, in which.

DETAILED DESCRIPTION

Figure 1:
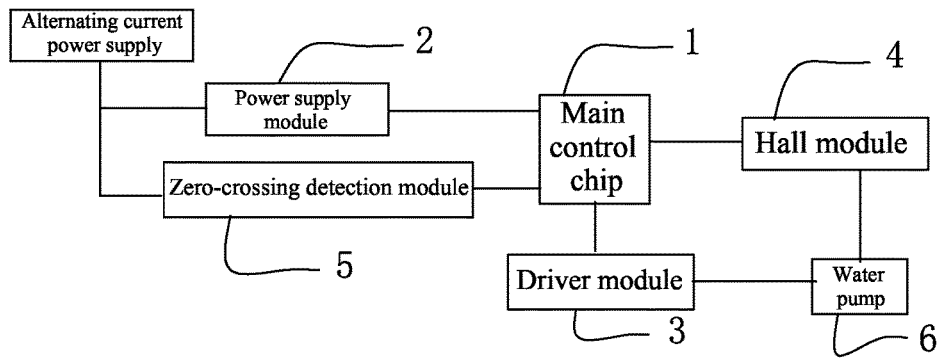
FIG. 1 is a block diagram of a circuit principle connection structure according to an example embodiment.

Reference will now be made in detail to example embodiments which are illustrated in the accompanying drawings, wherein like reference numerals refer to like elements throughout. In this regard, the example embodiments may have different forms and may not be construed as being limited to the descriptions set forth herein.

It will be understood that the terms "include," "including", "comprise, and/or "comprising," when used in this specification, specify the presence of stated features, integers, steps, operations, elements, and/or components, but do not preclude the presence or addition of one or more other features, integers, steps, operations, elements, components, and/or groups thereof.

It will be further understood that, although the terms "first," "second," "third," etc., may be used herein to describe various elements, components, regions, layers and/or or sections, these elements, components, regions, layers and/or sections may not be limited by these terms. These terms are only used to distinguish one element, component, region, layer or section from another element, component, region, layer or section.

As used herein, the term "and/or" includes any and all combinations of one or more of the associated listed items. Expressions such as "at least one of," when preceding a list of elements, modify the entire list of elements and do not modify the individual elements of the list.

Various terms are used to refer to particular system components. Different companies may refer to a component by different names—this document does not intend to distinguish between components that differ in name but not function.

Matters of these example embodiments that are obvious to those of ordinary skill in the technical field to which these exemplary embodiments pertain may not be described here in detail.

As shown in FIG. 1, according to an example embodiment, a directional and timing control circuit for a water pump comprises a main control chip 1, a power supply module 2, a driver module 3, a Hall module 4, and a zero-crossing detection module 5.

An input terminal of the power supply module 2 is connected to an alternating current power supply. The power supply module 2 supplies power to the main control chip 1 and a water pump 6. A control output terminal of the main control chip 1 is connected to the driver module 3, and an output terminal of the driver module 3 is connected to the water pump 6. The Hall module 4 is provided on a rotating shaft of the water pump 6, and a signal output terminal of the Hall module 4 is connected to an operation direction detection port of the main control chip 1. An input terminal of the zero-crossing detection module 5 is connected to the alternating current power supply, and an output terminal of the zero-crossing detection module 5 is connected to a phase detection terminal of the main control chip 1.

The main control chip 1 may be a SinOne single-chip microcomputer SC92F7320M08U, which has sufficient internal resources, a wide voltage range, and a wide working temperature range. Alternately, the main control chip 1 may be another chip.

Figure 2:
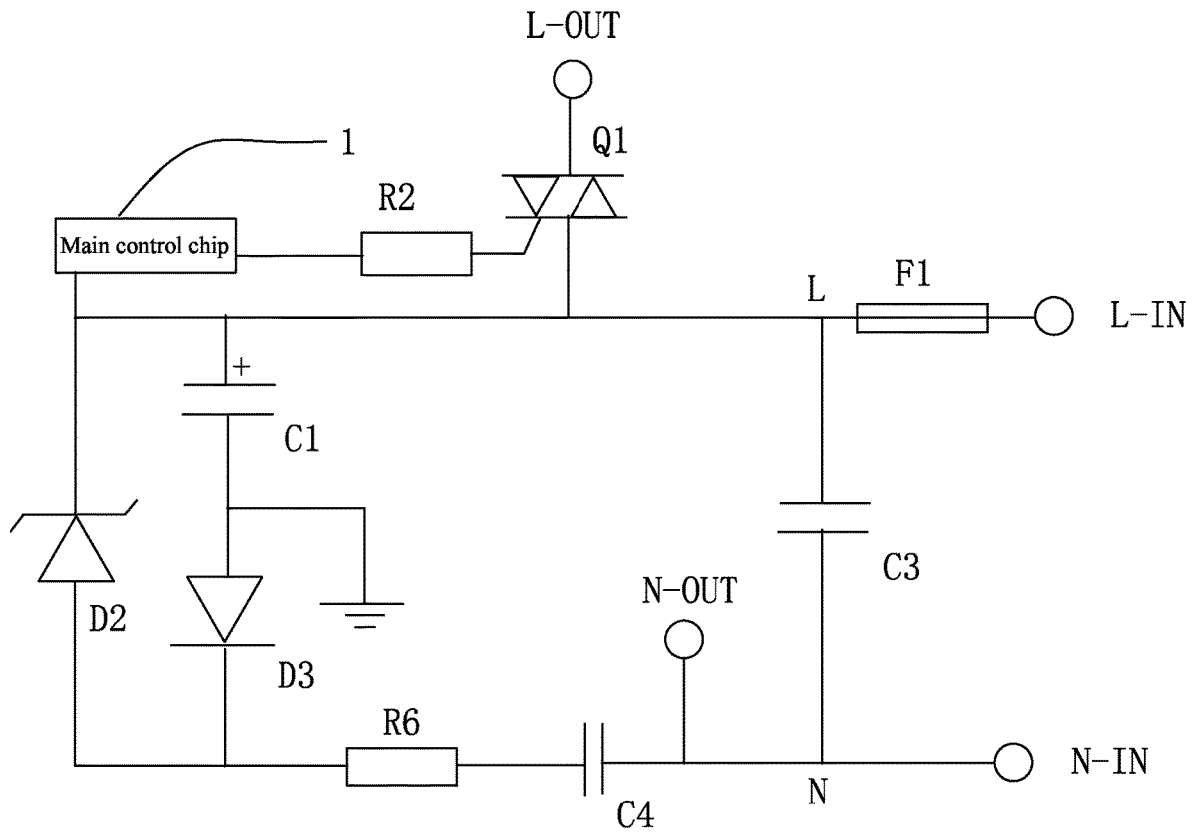
FIG. 2 is a schematic diagram of a circuit structure of a power supply module and a driver module according to an example embodiment.

The power supply module 2 supplies power to the main control chip 1. As shown in FIG. 2, the power supply module 2 may comprise a resistor R6, an electrolytic capacitor C1, a capacitor C4, a diode D3, and a Zener diode D2.

A live wire input terminal L-IN is connected to a positive electrode of the electrolytic capacitor C1 using a fuse F1; a negative electrode of the electrolytic capacitor C1 is connected to an anode of the diode D3; a cathode of the diode D3 is connected to a first terminal of the resistor R6; a second terminal of the resistor R6 is connected to a first terminal of the capacitor C4; a second terminal of the capacitor C4 is connected to a neutral wire input terminal N-IN; and the negative electrode of the electrolytic capacitor C1 is grounded. A cathode of the Zener diode D2 is connected to the positive electrode of the electrolytic capacitor C1, and an anode of the Zener diode D2 is connected to the first terminal of the resistor R6. The cathode of the Zener diode D2 is connected to a power supply terminal of the main control chip 1.

The resistor R6 is used as a current limiting resistor and limits a current at the moment of powering on the circuit, to prevent a surge current from damaging the Zener diode D2. The alternating current power supply is input through the live wire input terminal L-IN and the neutral wire input terminal N-IN, and charges the electrolytic capacitor C1 after the current is limited by the resistor R6 and the capacitor C4. The Zener diode D2 is used as a voltage limiter, and the electrolytic capacitor C1 gains a working voltage of 3.6V, the working voltage being supplied to the main control chip 1.

According to one example aspect, the driver module 3 may be a thyristor driver module. The thyristor driver module comprises a bi-directional thyristor Q1 and a resistor R2. Alternately, the driver module 3 may be another module.

One terminal of the bi-directional thyristor Q1 is connected to the live wire input terminal L-IN; a control terminal of the bi-directional thyristor Q1 is connected to a first terminal of the resistor R2; and a second terminal of the resistor R2 is connected to a control output terminal of the main control chip. A second terminal of the bi-directional thyristor Q1, as a live wire output terminal L-OUT, is connected to the water pump; and the second terminal of the capacitor C4, as a neutral wire output terminal N-OUT, is connected to the water pump.

The control terminal of the bi-directional thyristor Q1 in the thyristor driver module 3 is connected to the control output terminal of the main control chip 1. When the main control chip 1 outputs a low level signal, the thyristor is triggered; and when the main control chip 1 outputs a high level signal, the thyristor is forbidden to be triggered. The live wire output terminal L-OUT and the neutral wire output terminal N-OUT are connected to a phase wire of a permanent magnet motor of the water pump 6, such that the switching on and off of the thyristor controls the work of the permanent magnet motor of the water pump 6.

The thyristor driver module 3 further comprises a capacitor C3, and the capacitor C3 is provided between the live wire output terminal L-OUT and the neutral wire output terminal N-OUT.

While operating at chopping frequency, the thyristor causes some interference to a power grid, and therefore, the capacitor C3 may perform differential mode filtering on the input alternating current power supply to reduce conducted interference.

The Hall module 4 comprises a Hall element U2 and a resistor R1. According to an example aspect, the model of the Hall element U2 may be OH49E.

A power input terminal of the Hall element U2 is connected to a push-pull output port of the main control chip 1; a signal output terminal of the Hall element U2 is connected to an operation direction detection port of the main control chip; a ground terminal of the Hall element U2 is connected to a first terminal of the resistor R1; and a second terminal of the resistor R1 is grounded.

The Hall module 4 is configured to detect a position of a permanent magnet rotor of the motor of the water pump; the resistor R1 as a current limiting resistor performs power protection for the main control chip and the Hall element U2; and the power input terminal of the Hall element U2 is connected to the push-pull output port of the main control chip 1, to control power supply to the Hall element U2.

The position of the permanent magnet rotor of the motor of the water pump is detected by using the Hall module 4; the main control chip 1 controls the motor to operate in a correct direction according to the position of the rotor and an energization condition in real time, to achieve directional control of the water pump 6. For example, the position detected by the Hall element U2 in real time may be divided into a phase A and a phase B, and an alternating voltage includes a positive half cycle P and a negative half cycle N. When the Hall element detects the phase A, the rotor of the motor rotates in the case of energization in the positive half cycle P; and when the Hall element U2 detects the phase B, the rotor of the motor rotates in the case of energization in the negative half cycle N. The directional control of the water pump 6 may improve a filtering effect, and may provide energy-saving.

Figure 3:
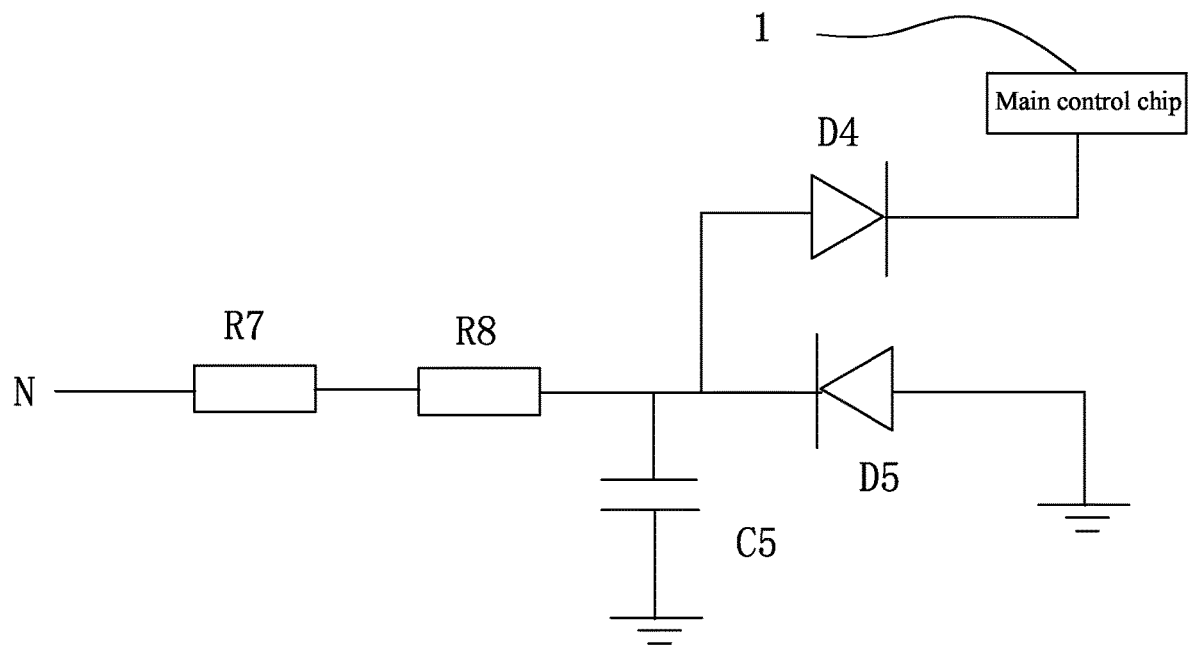
FIG. 3 is a schematic diagram of a circuit structure of a zero-crossing detection module according an example embodiment.
Figure 4:
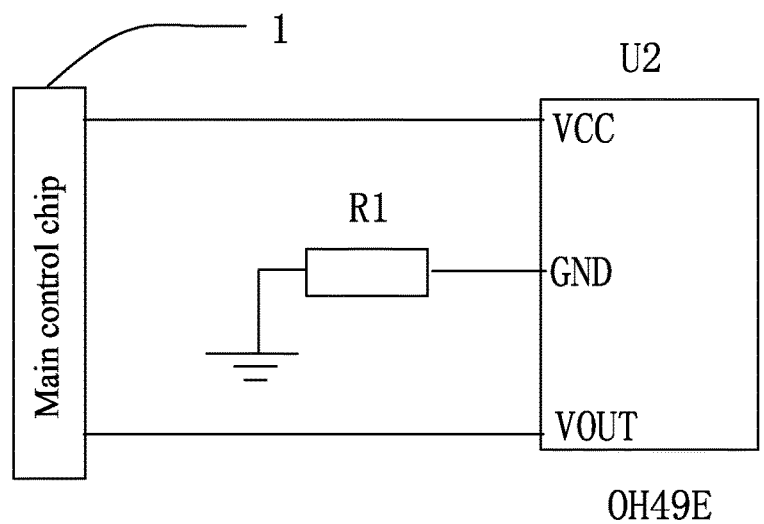
FIG. 4 is a schematic diagram of a circuit structure of a Hall module according to an example embodiment.

As shown in FIG. 3, the zero-crossing detection module 5 is configured to obtain a current utility frequency of the circuit. The zero-crossing detection module 5 comprises a resistor R7, a resistor R8, a diode D4, a diode D5, and a capacitor C5.

A first terminal of the resistor R7, as an input terminal, is connected to the alternating current power supply, and is connected the neutral wire of the alternating current power supply in this example embodiment. A second terminal of the resistor R7 is connected to a first terminal of the resistor R8; a second terminal of the resistor R8 is connected to a first terminal of the capacitor C5; a second terminal of the capacitor C5 is grounded; a cathode of the diode D5 is connected to the second terminal of the resistor R8; an anode of the diode D5 is grounded; an anode of the diode D4 is connected to the second terminal of the resistor R8; and a cathode of the diode D4 is connected to the phase detection terminal of the main control chip 1.

The zero-crossing detection module 5 is used by the main control chip 1 to detect a phase of an input of the current alternating current power supply. The resistor R7 and the resistor R8 are current limiting resistors, and the capacitor C5 is configured to filter a differential mode signal on the alternating current power supply and suppress occurrence of a zero-crossing interference signal. The diode D4 and the diode D5 are clamping diodes, and are two diodes with a low leakage current and a small voltage drop, and the diode D4 and the diode D5 clamp a voltage of the detection signal within an input voltage range allowable for a port of the main control chip.

In this example embodiment, the main control chip 1 uses the zero-crossing detection module 5 to detect a zero-crossing cycle a plurality of times in 300 ms before startup to identify a current working utility frequency, and uses the utility frequency as a counter. After being powered on, the circuit works for a total of N hours and then stops for 24-N hours. The circuit working cyclically in this way may reduce energy loss of unceasing operations, may be convenient to operate, and may save manpower.

The power supply module 2 of the directional and timing control circuit for a water pump in this example embodiment supplies power to the main control chip 1; the position of the permanent magnet rotor of the motor of the water pump is detected by using the Hall module 4; the main control chip 1 controls the motor to operate in a correct direction according to the position of the rotor and the energization condition in real time, to achieve directional control of the water pump. Accordingly, a filtering effect may be improved, and energy may be saved.

The zero-crossing detection module 5 is used to detect the zero-crossing cycle of the alternating current power supply of the circuit a plurality of times to identify the current working utility frequency of the circuit, and use the utility frequency as a counter. After being powered on, the circuit works for a total of N hours and then stops for 24-N hours. The circuit working cyclically in this way may reduce energy loss of unceasing operations, may be convenient to operate, and may save manpower.

The water filtering pump using the directional and timing control circuit for a water pump in this example embodiment can achieve a 24 hours' cycle work, so that the energy loss of unceasing operations may be reduced, and a filtering effect may be improved after directional control is applied, which may be more energy-saving.

It may be understood that the exemplary embodiments described herein may be considered in a descriptive sense only and not for purposes of limitation. Descriptions of features or aspects within each exemplary embodiment may be considered as available for other similar features or aspects in other exemplary embodiments.

While exemplary embodiments have been described with reference to the figures, it will be understood by those of ordinary skill in the art that various changes in form and details may be made therein without departing from the spirit and scope as defined by the following claims.

What is claimed is:

1. A directional and timing control circuit comprising:
   a main control chip;
   a power supply module connected to the main control chip to supply power to the main control chip, the power supply module comprising an input terminal configured to connect to an alternating current power supply;
   a driver module configured to receive a control command from the main control chip and to control a motor according to the control command;
   a Hall module configured to detect an operation direction of the motor and transmit an operation direction signal to the main control chip; and
   a zero-crossing detection module configured to detect a zero-crossing cycle of the alternating current power supply to thereby obtain a current utility frequency of the alternating current power supply as a timing frequency of the main control chip, the zero-crossing detection module comprising an input terminal connected to the alternating current power supply and an output terminal connected to a phase detection terminal of the main control chip.

2. The directional timing and control circuit according to claim 1, wherein the power supply module comprises:
   a power supply resistor comprising a first terminal and a second terminal;
   a first capacitor which is an electrolytic capacitor comprising:

a positive electrode connected to a live wire input terminal, and
a negative electrode which is grounded;
a second capacitor comprising:
a first terminal connected to the second terminal of the power supply resistor, and
a second terminal connected to a neutral wire input terminal;
a first diode comprising:
an anode connected to the negative electrode of the first capacitor, and
a cathode connected to the first terminal of the power supply resistor;
a second diode which is a Zener diode comprising:
a cathode connected to the positive electrode of the first capacitor and to a power supply terminal of the main control chip; and
an anode connected to the first terminal of the power supply resistor.

3. The directional timing and control circuit according to claim 2, wherein the driver module is a thyristor driver module comprising:
a bi-directional thyristor comprising:
a first terminal connected to the live wire input terminal,
a second terminal which is a live wire output terminal, and;
a control terminal; and
a driver module resistor comprising:
a first terminal connected to the control terminal of the bi-directional thyristor, and
a second terminal connected to a control output terminal of the main control chip;
wherein the second terminal of the second capacitor is a neutral wire output terminal.

4. The directional timing and control circuit according to claim 3, wherein the driver module further comprises:
a capacitor connected between the live wire output terminal and the neutral wire output terminal.

5. The directional timing and control circuit according to claim 1, wherein the Hall module comprises:
a Hall element comprising:
a power input terminal connected to a push-pull output port of the main control chip,
a signal output terminal connected to an operation direction detection port of the main control chip, and
a ground terminal; and
a Hall module resistor comprising:
a first terminal connected to the ground terminal of the Hall element, and
a second terminal which is grounded.

6. The directional timing and control circuit according to claim 2, wherein the Hall module comprises:
a Hall element comprising:
a power input terminal connected to a push-pull output port of the main control chip,
a signal output terminal connected to an operation direction detection port of the main control chip, and
a ground terminal; and
a Hall module resistor comprising:
a first terminal connected to the ground terminal of the Hall element, and
a second terminal which is grounded.

7. The directional timing and control circuit according to claim 1, wherein the zero-crossing detection module comprises:
a first resistor comprising:
a first terminal that is an input terminal configured to be connected to the alternating current power supply, and
a second terminal;
a second resistor comprising:
a first terminal connected to the second terminal of the first resistor, and
a second terminal;
a first diode comprising:
an anode connected to the second terminal of the second resistor, and
a cathode connected to the phase detection terminal of the main control chip;
a second diode comprising:
a cathode connected to the second terminal of the second resistor,
an anode which is grounded; and
a capacitor comprising:
a first terminal connected to the second terminal of the second resistor,
a second terminal which is grounded.

* * * * *